United States Patent
Hogan et al.

(10) Patent No.: US 7,814,368 B2
(45) Date of Patent: Oct. 12, 2010

(54) ADJUSTING THRESHOLD FOR SOFTWARE ERROR RESET ATTEMPTS TO BE COMMENSURATE WITH RESERVE POWER

(75) Inventors: Michael T. Hogan, Beecroft (AU); Thomas McDermott, Thornleigh (AU)

(73) Assignee: G2 Microsystems Pty. Ltd., Haymarket (AU)

( * ) Notice: Subject to any disclaimer, the term of this patent is extended or adjusted under 35 U.S.C. 154(b) by 695 days.

(21) Appl. No.: 11/704,556

(22) Filed: Feb. 8, 2007

(65) Prior Publication Data

US 2008/0155323 A1    Jun. 26, 2008

Related U.S. Application Data

(60) Provisional application No. 60/785,008, filed on Mar. 22, 2006.

(51) Int. Cl.
    *G06F 11/00* (2006.01)

(52) U.S. Cl. .................. 714/22; 455/574; 713/2; 713/320; 714/6

(58) Field of Classification Search .............. 713/320, 713/2, 340; 455/574; 714/6, 22
    See application file for complete search history.

(56) References Cited

U.S. PATENT DOCUMENTS

6,651,188 B2 *  11/2003  Harding et al. .............. 714/38
6,757,838 B1 *  6/2004   Chaiken et al. ............... 714/5

* cited by examiner

*Primary Examiner*—Albert Wang
(74) *Attorney, Agent, or Firm*—Blakely Sokoloff Taylor & Zafman LLP

(57) ABSTRACT

Power consumption that occurs in response to software errors may be reduced. In one example a system tracks a number of occurrences a first set of code causes a system to perform one or more reset actions, determines whether the number of occurrences exceeds a threshold, and selects a second set of code to execute in place of the first set of code, if the quantity exceeds the threshold.

20 Claims, 3 Drawing Sheets

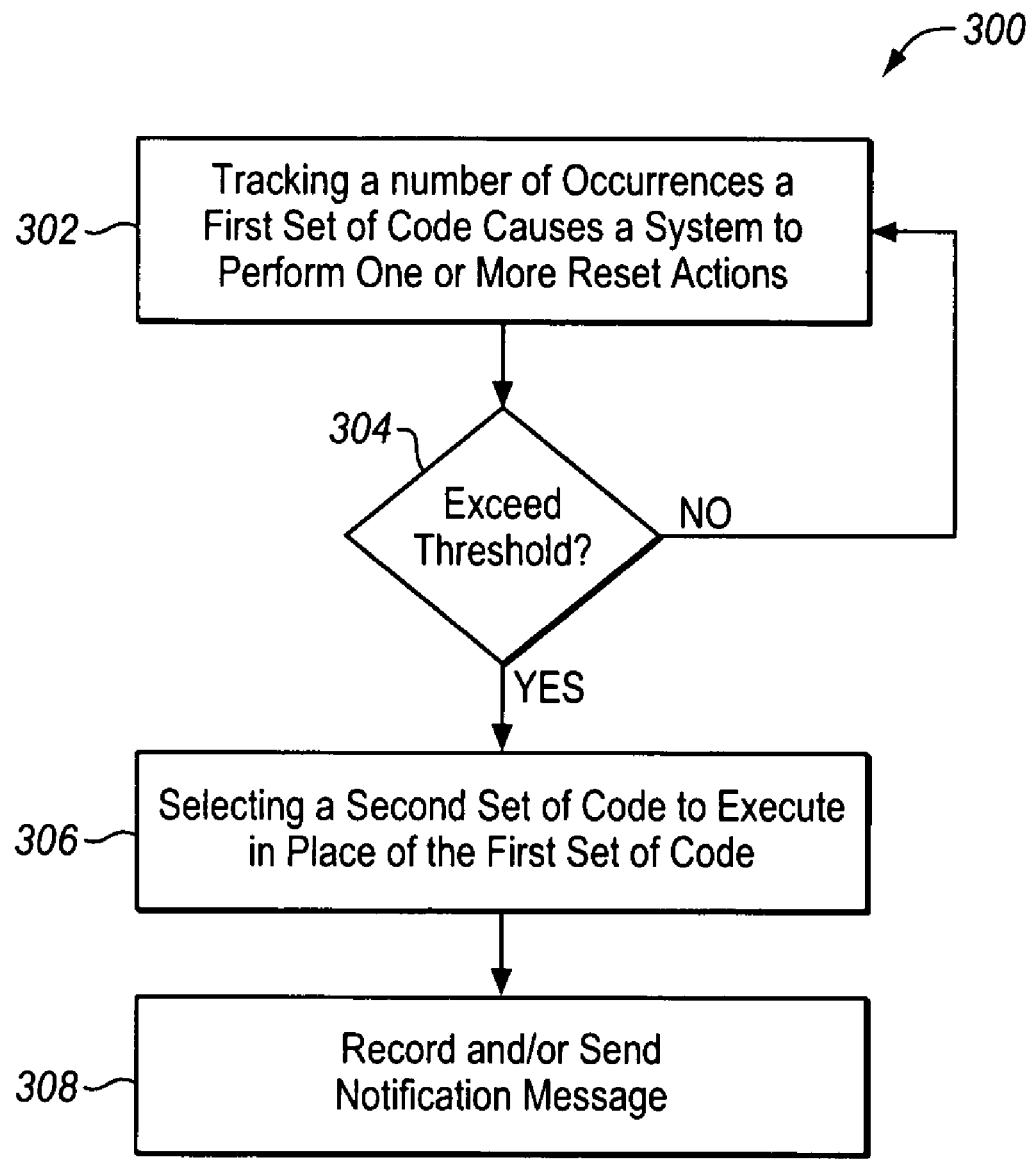

ADJUSTING THRESHOLD FOR SOFTWARE ERROR RESET ATTEMPTS TO BE COMMENSURATE WITH RESERVE POWER

CROSS-REFERENCE TO RELATED APPLICATIONS

The present application claims the priority of provisional application Ser. No. 60/785,008, filed Mar. 22, 2006.

BACKGROUND

1. Field

The present invention relates generally to computing devices having embedded controllers with limited power resources, and more specifically, to conserving power in such devices when they experience a fault condition due to a software glitch.

2. Related Art

It is important in a computing device with embedded controllers to ensure that software errors do not cause the device to become unresponsive, and/or require human intervention to correct a fault condition. A common mechanism used to address this problem is a watchdog timer, which is a fail-safe mechanism that intervenes if a system stops functioning. In other words, if a software application "crashes" or "hangs," the watchdog timer will expire, and the entire system will be reset automatically. By resetting the device, it is possible to restart the software application that may have malfunctioned and bring the computing device back to a normal mode of operation in which it is responsive.

A watchdog timer is usually implemented as part of a microcontroller (embedded controller) that can cause a processor to reset when it judges that the microcontroller has hung, or is no longer executing the correct sequence of code. In one common implementation, a counter is set to a certain count-value and is periodically decremented by hardware i.e., counts down towards zero. It is then the responsibility of one or more software applications to reset the count-value to its original value often enough to ensure that it never reaches zero. If it does reach zero, it is assumed that the software has failed in some manner and the microcontroller is reset. There are various terms used to refer to restarting the timer: strobing, petting, kicking or updating the timer. The watchdog timer is meant to minimize the effect of software errors and should only cause the embedded controller to become unresponsive for a brief period.

One drawback with this approach is that if a particular embedded software application is badly out-of-order, it may enter a state in which the system is continually reset by the watchdog timer. In the context of computing devices with limited sources of power, such as Radio Frequency Identification (RFID) tags, this may cause a significant power drain. For example, if the computing device crashes in a high-power state prior to the software malfunction being detected and the system is continually reset, its battery may be depleted rapidly. Unless the software malfunction is detected and remedied by a human before the battery is depleted, the RFID tag or a similar computing device will exhaust reserve power and it will no longer function.

SUMMARY

Power consumption that occurs in response to software errors may be reduced. In one example a system tracks a number of occurrences a first set of code causes a system to perform one or more reset actions, determines whether the number of occurrences exceeds a threshold, and selects a second set of code to execute in place of the first set of code, if the quantity exceeds the threshold.

BRIEF DESCRIPTION OF THE DRAWINGS

The detailed description is explained with reference to the accompanying figures. In the figures, the left-most digit(s) of a reference number identifies the figure in which the reference number first appears.

FIG. 3 illustrates an exemplary method 300 for conserving power in a computing device, such as device 100 of FIG. 1.

DETAILED DESCRIPTION

Power consumption caused by a watchdog timer and may be reduced by tracking a quantity of times a system is restarted (or some other reset action(s) are performed) as an indication of faulty code. An earlier version of the code, a default set of code, and/or a different set of code may be selected if the number of restarts exceeds a threshold. Launching a different set of code in place of the faulty code prevents the system from exhausting its power prematurely as a result of persistently restarting in response to encountering the faulty code.

In other words, a previous version of a set of code or a different set of code may be selected to execute in place of a current version of a set of code, if the number of watchdog events associated with the current version of the set of code exceeds a threshold value. The threshold value may be a predetermined count value, or may be adjusted dynamically in response to monitoring available power levels for the system. A message may be sent indicating that a different version of code was selected in place of a current version of code, to alert a human of the error conditions that have been encountered. The current set of code (i.e., the faulty code) is typically marked as invalid and is not permitted to be loaded for execution again.

It has been observed that when a computing device encounters faulty code associated with a set of code, such as application software or system software, the set of code fails to kick the watchdog. As a result, the watchdog timer expires and the computing device is reset and the set of code is restarted. In the context of computing devices with limited sources of power, such as Radio Frequency Identification (RFID) tags, this is a major problem as mentioned above. For example, if the computing device crashes in a high-power state prior to the software malfunction being detected and the system is continually reset, its battery will be depleted rapidly. Unless the software malfunction is detected and remedied by a human before the battery is depleted, the RFID tag or a similar computing device will exhaust reserve power and it will no longer function.

Figure 1:
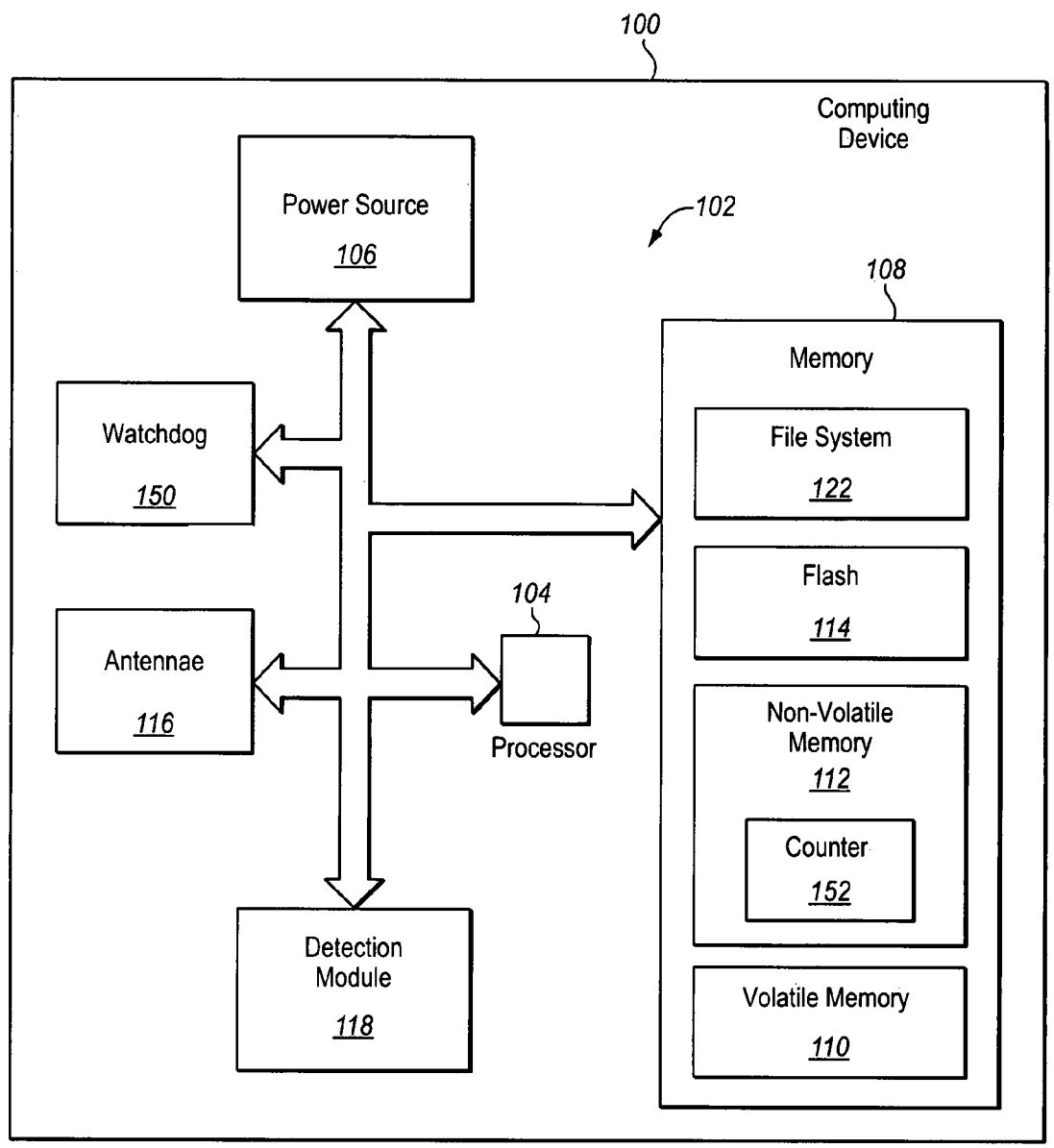
FIG. 1 illustrates a computing device 100 within which the present invention can be either fully or partially implemented.

An automatic system and method may be used to respond to software errors. Such a system may operate to reduce power consumption associated with resetting the computing device. For instance, FIG. 1 illustrates a computing device 100 within which an embodiment of the present invention can be either fully or partially implemented. In one possible embodiment, computing device 100 is implemented as a Radio Frequency Identification (RFID) tag. Although some of the discussion below will focus on an RFID tag as an example, the applicability of the present invention is not limited to RFID tags, and may be used with other computing devices 100. For example, computing device 100 may be other general or special purpose computing devices, such as, but not limited to, wireless communication devices (e.g., mobile phones), music players, multimedia recorders and players, personal digital assistants, mobile gaming systems, the combination of any of the above example devices, and other suitable intelligent devices.

Computing device 100 includes an embedded controller 102 including at least one processor 104, a limited power source 106, such as a battery, and a memory 108. Memory 108 may include volatile memory (e.g., RAM) 110 and/or non-volatile memory (e.g., ROM) 112. In some implementations, volatile memory 110 is used as part of the computing device's cache, permitting application code and/or data to be accessed quickly and executed by processor 104. Memory 108 may also include non-volatile memory in the form of flash memory 114. It is also possible for other memory media (not shown) having various physical properties to be included as part of computing device 100.

A file system 122 may reside as a component in the form of computer-executable instructions and/or logic within memory 108, that when executed serves as a logical interface between code stored in flash 114 and other storage mediums. File system 122 is generally responsible for performing transactions on behalf of code stored in ROM or one or more applications. File system 122 may also assist in storing, retrieving, organizing files, and performing other related tasks associated with code and/or data. That is, file system 122 has the ability to read, write, erase, and manage files (applications, etc.).

Computing device 100 may also include one or more antennae 116 to transmit and/or receive radio frequencies and other energy wirelessly. Additionally, computing device 100 may include a detection module 118 configured to receive and detect electrical and/or magnetic energy or other events which as shall be explained cause computing device 100 to transition from a first power-state to a second power-state or vice versa. Detection module 118 may be implemented as hardware and optionally software and/or firmware that causes computing device 100 to detect different types of power-state transition events. A power-state transition event is typically one of a plurality of different events which causes computing device 100 to transition from one power-state to another power-state. Examples of such events include, but are not limited to, expiration of a timer (not shown), a radio frequency request for an electronic product code such as from a reader (not shown), receipt of magnetic energy such as from a choke point (not shown), detection of a current such as via radio frequency signal, a watchdog event, and any series of succeeding events within a specified period of time.

Detection module 118 is typically connected in some fashion to controller 102 (processor 102 and memory 108). In the example of FIG. 1, a data bus connects detection module 118, antenna 116, memory 108, processor 102 and a watchdog timer 150 described below. Each of these devices can communicate with processor 102 and memory 108 and, as appropriate with each other. The power source 106 is shown as also connected on this bus. This may be to provide status and control signals to a controller of the power supply. The devices are also connected through a power bus to the power source to power each component.

Detection module 118 may record a power-state transition event when it is detected by detection module 118. For example, when detection module 118 is at least partially implemented in hardware, receipt of certain electrical energy such as a particular radio frequency through connected antenna 116, may cause detection module 118 to send one or more signals to controller 102, which in turn causes controller 102 to transition from one power-state (e.g., sleep mode) to another power-state (e.g. awake mode).

In one embodiment, when detection module 118 detects a power-state transition event such as a particular radio frequency, the event is recorded in memory 108. The event may be recorded as a simple flag, setting of a bit, or recording of a code. Typically, the recording of the event is indicative of what type of event occurred. For example, the recordation of a code having a value of 1 may indicate that a particular radio frequency was received, the recordation of a value 2 may indicate a timer expired, the recordation of a value 3 may indicate that the battery is low, and so forth. It is noted that the aforementioned values are for discussion purposes, and that actual signals, bits or data that are recorded indicative of an event may take various forms.

Computing device 100 may also include a watchdog timer 150. In one embodiment, watchdog 150 is a hardware counter, but may be implemented as firmware, as part of a state machine, or in any combination of the aforementioned. The watchdog 150 may be implemented in a variety of different ways so as to notify a processor 104 to perform one or more reset actions such as rebooting. Typically, watchdog 150 causes processor 104 to perform the one or more reset actions, when watchdog 150 is not alerted by a software application or system code before its timer reaches a predetermined value (e.g., is decremented to zero or is incremented to a certain value). This is an indication that computing device 102 has hung, or is no longer executing a correct sequence of code.

In other words, watchdog 150 is a timer that waits to receive an alert. If it receives the alert, then it resets. If it does not receive the alert before its timer expires, then it signals connected processor 104 to reset, restart, or reboot, depending on the design. It is the responsibility of the software code (each set of application code or system code) to send the alerts. The alerts set the count of watchdog 150 to its original value often enough to ensure that it never reaches the predetermined value (expires). If it does expire, it is inferred that the particular software code running at the time has failed in some manner and processor 104 (or central processing unit) is reset.

A properly designed watchdog 150, detects events that hang a system, such as computing device 100. When the software hands, then it cannot send the alert to reset the timer. For example, bugs in code can cause computing device 100 to hang. Watchdog 150 guarantees that no glitch hangs computing device 100 indefinitely. However, if the error in the code is persistent, watchdog timer 150 may repetitively cause reset actions to occur (referred to herein as watchdog events), which can quickly cause computing device 100 to exhaust power source 106.

For example, when watchdog 150 does not receive an alert and it expires, a status bit or some other information may be recorded in memory 108. The recorded information may include an indication of what set of code was operating at the time of the error. Additionally, a counter 152 maintained in non-volatile memory 112 may maintain a count indicating how many watchdog events occurred which were associated with that particular set of code. As shall be explained, if the number of watchdog event occurrences exceeds a threshold value, then a different set of code may be launched and executed by processor 104 in place of whatever code was operating at the time of the error. This different set of code may include a previous version of code if the faulty software code was recently updated. The different set of code may also include an alternative version of the errant code, or a fail-safe set of code (akin to a spare tire) which may be used to keep the computing device running until the faulty code can be updated with a corrected version of code.

Counter 152 may be implemented in various formats. Additionally, it is also possible not to use a counter 152, such as a hardware circuit which uses variable voltage which is increased or decreased in response to each occurrence of a watchdog event, such that when the voltage exceeds a particular voltage threshold it in turn resets computing device 100. Alternatively, a shift register may be used as means to measure occurrences of each watchdog event.

Figure 2:
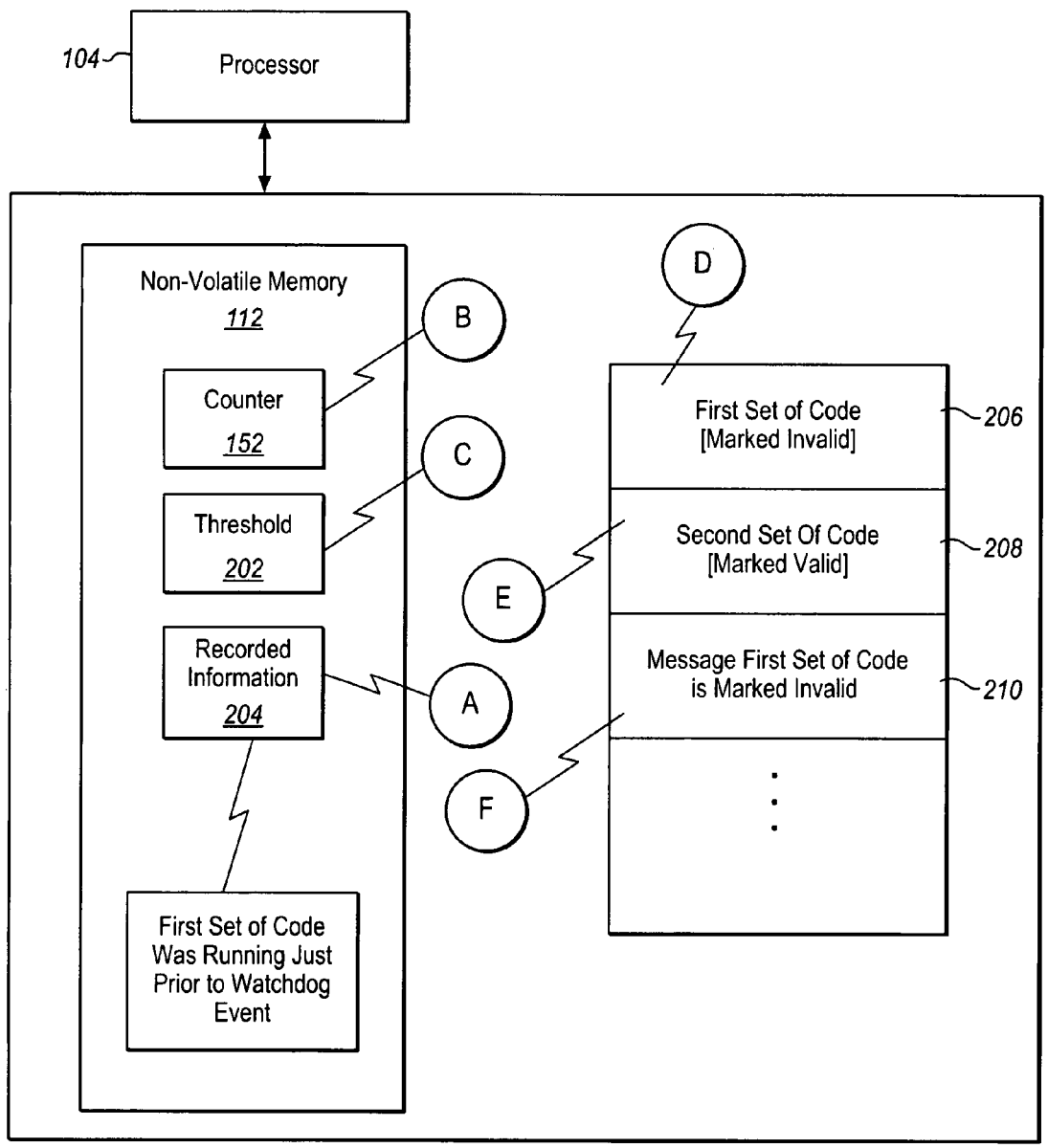
FIG. 2 shows a logical computing environment in which mini-applications (code) are accessed and executed, responsive to particular power-state transitional events.

FIG. 2 shows a logical computing environment in which a second set of code is marked valid and executed in place of a first set of code, responsive to receiving a number of watchdog events exceeding a threshold. When a watchdog event occurs, information 204 is recorded (Step A) in non-volatile memory 112 indicating which set of code was executing on processor 104 just prior to the watchdog event. This information may be recorded in several forms, depending on the implementation of computing device 100. For instance, in one embodiment, file system 122 (FIG. 1) may provide enough information to determine which code was running at the time of a watchdog event. That is, file system 122 (FIG. 1) may record a pointer to indicate which set of code was executing at a time of a watchdog event. In another embodiment, a flag may be recorded indicative of the type of software code running prior to the watchdog.

A count maintained by counter 152, also in non-volatile memory 112, is then incremented (or decremented) (Step B). In one embodiment, a count corresponding to the set of code which was executing prior to the watchdog event may be incremented. Alternatively, a single count may be maintained by counter 152 which indicates the total number of times a watchdog event occurs. Additionally, timers (not shown) may also be used in conjunction with counter 152 to determine if a certain number of watchdog events occur within a certain period of time. For example, if three watchdog events occur within an hour, it may mean that there is a catastrophic bug in the software code which was running at the time of the watchdog event.

Each time a watchdog event occurs, and computing device 100 reboots or performs one or more other actions in response to the watchdog event, processor 104 executes code from non-volatile memory (e.g., ROM) 112 (FIG. 1), which prompts computing device 100 to reboot, or restart, or reset. For instance, as part of executing a first code, processor 102 is instructed to examine recorded information 204, a count maintained by counter 152, and compare the count to threshold 202. A determination is then made (Step C) whether the count maintained by counter 152 exceeds threshold 202 stored in non-volatile memory 112. For example, if a count corresponding with a first set of code 206 exceeds a threshold quantity value, then system 100 automatically takes action to replace first of code 206 with a different set of code, such as a second set of code 208. That is, it is assumed that there is an error with first set of code 206, which is persistently causing computing device 100, via controller 102, to take actions in response to watchdog events. Unless corrective measures are taken, computing device 100 will consume all its reserve power.

Accordingly, any indication that the count maintained by counter 152 exceeds threshold 202, prompts computing device 100 to mark the code which presumably caused the watchdog event as invalid. For example, suppose first set of code 206 was the code with a count exceeding threshold 202. After a watchdog event, computing device 100, via controller 102 (FIG. 1), marks first set of code 206 as invalid.

In place of first set of code 206, computing device 100 then marks second set of code 208 as valid (Step E), for execution by processor 104. Second set of code 206 may include: a previous version of the first set of code, a default version of the first set of code, a new version of the first set of code, a fail-state version of code used to maintain computing device 100 in an operational state, or some other version of code. By loading second set of code 208 (e.g. fallback code) in place of first set of code 206, it prevents computing device 100 from experiencing an infinite watchdog loop, and eventual exhaustion. This also permits computing device 100 to remain functional at some level to accept further code updates or upgrades.

Second set of code 208 may be application code and/or system code. It is noted that any suitable techniques used for accessing the second set of code in place of the first of set of code including state machine logic, direct memory mapping, or other techniques as would be appreciated by those skilled in the art having the benefit of this disclosure.

Additionally, in Step D, controller 102 may send a message 210 (or record information for retrieval at a later time) indicating that first set of code 206 was marked invalid. In other words, message 210 enables a supervisor to take action to replace the defective set of code, such as replacing it with a different version of code if second set of code 208 was only a temporary stopgap measure.

It is noted that threshold 202 may be a predetermined value or may be dynamically adjusted. For example, in one embodiment, a value for threshold value 202 may be adjusted commensurate with the amount of reserve power measured from power source 106 (FIG. 1). A newer power source may have more power and hence there may be more leniency toward occurrences of watchdog events, and hence a higher threshold value to trigger corrective action in response to several watchdog events. However, if power source 106 is diminished there may be less leniency if a watchdog event occurs, and hence a lower threshold value to trigger only after one or two watchdog events.

FIG. 3 illustrates an exemplary method 300 for reducing power consumption in response to software errors. Method 300 includes blocks 302, 304, 306, and 308. (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof. Additionally, although each module in FIG. 3 is shown as a single block, it is understood that when actually implemented in the form of computer-executable instructions, logic, firmware, and/or hardware, that the functionality described with reference to it may not exist as separate identifiable block.

Referring to FIG. 3, in block 302 the number of occurrences a first set of code causes a system to perform one or more reset actions is tracked. For example, a count maintained by counter 152 (FIGS. 1 and 2) indicates the number of times a first set of code may have caused the system to perform one or more reset actions in response to a watchdog event. The one or more reset actions performed by a computing device may cause the system to reload the first set of code and restart its operation from a starting point, may cause computing device 100 to switch from a high-power state to a low-power state, and then back to a high-power state, and/or restart system operation code from initialization (e.g., reboot).

In block 304, a determination is made whether the number of occurrences exceeds a threshold. For example, the count maintained by counter 152 (FIGS. 1 and 2) is compared to a threshold 202 (FIG. 2) such as a value to determine if the count exceeds the threshold. If the count does not exceed the threshold, then according to the NO branch of block 304, method 300 proceeds back to block 302 and no action is taken with respect to the first set of code other than to record the instance of the watchdog event. If the count does exceed the threshold, then according to the YES branch of block 304, method 300 proceeds back to block 306. As mentioned above, the threshold may be a predetermined value or a value that is dynamically adjusted downward as power reserves decrease. In other words, in some embodiments, when power reserves are low, the first set of code is replaced after a smaller number of watchdog events, than when the power reserves are greater.

In block 306, a second set of code is selected to execute in place of the first set of code. For example, a second set of code 208 (FIG. 2) is marked valid for loading and execution in place of a first set of code 206 (FIG. 1), which is marked as invalid. The second set of code may be a fallback set of code to load and execute in place of the first set of code, to conserve power by preventing the first set of code from repeatedly causing the system to reset and perform the one or more reset actions. The first and/or second set of code may include an application or system code. Additionally, the second set of code may be an alternative version of the first set of code, or a previous version of the first set of code.

In block 308, a notification message is either recorded or sent indicating that the second set of code was loaded and executed in place of the first set of code. That is, the message may indicate that there is an error associated with the first set of code which caused the system to perform one or more reset actions beyond a threshold and it was replaced by a second set of code.

A lesser or more equipped computing device, watchdog timer, and code management system than the examples described above may be preferred for certain implementations. Therefore, the configurations will vary from implementation to implementation depending upon numerous factors, such as price constraints, performance requirements, technological improvements, or other circumstances. The particular nature of the computing device and any attached devices may be adapted to the intended use of the device. Any one or more of the devices, interfaces, or interconnects may be eliminated from this system and others may be added. For example, a variety of different connections to other equipment may be provided based on different wired or wireless protocols. In addition, a variety of different power sources may be adapted to suit different applications.

While embodiments of the invention have been described in the context of a radio frequency identification tag, the approaches and techniques described here may be applied to a wide variety of different contexts in which it is preferred that the computing device be able to operate without immediate human intervention. In addition, embodiments of the invention may be applied to professional or consumer equipment and to inventory systems as well as service provider systems.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. Many further modifications and adaptations may be made. The particular embodiments are not provided to limit the invention but to illustrate it.

Reference herein to "one embodiment", "an embodiment", or similar formulations herein, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The embodiments described herein are to be considered in all respects only as exemplary and not restrictive. The scope of the invention is, therefore, indicated by the subjoined claims rather by the foregoing description. All changes which come within the meaning and range of equivalency of the claims are to be embraced within their scope.

What is claimed is:

1. A method comprising:
   tracking a number of occurrences a first set of code causes a system to perform one or more reset actions;
   determining whether the number of occurrences exceeds a threshold;
   selecting a second set of code to execute in place of the first set of code, if the quantity exceeds the threshold;
   measuring an amount of reserve power from a power source; and
   dynamically adjusting the threshold commensurate the measured amount of reserve power.

2. The method of claim 1, wherein the one or more reset actions cause the system to restart operating system code at a start point.

3. The method of claim 1, wherein the one or more reset actions cause the system to reload the first set of code and restart its operation from its start point.

4. The method of claim 1, wherein the one or more reset actions cause the system to switch from a high-power state to a low-power state, and then back to a high-power state, including restarting system code to begin executing at its start point.

5. The method of claim 1, wherein selecting a second set of code further comprises preventing the first set of code from repeatedly causing the system to perform one or more reset actions.

6. The method of claim 1, wherein the first set of code is application software.

7. The method of claim 1, further comprising adjusting the threshold downward as power reserves decrease.

8. The method of claim 1, wherein the second set of code is an alternative version of the first set of code.

9. The method of claim 1, wherein the second set of code is a previous version of the first set of code.

10. The method of claim 1, further comprising sending a message indicating the second set of code was loaded and executed in place of the first set of code.

11. The method of claim 1, wherein the first set of code causes the system to perform one or more reset actions due to an error associated with the first set of code.

12. An apparatus comprising:
    means for tracking a number of occurrences a first set of code causes one or more portions of a system to reset;
    means for determining whether the number of occurrences exceeds a threshold;
    means for selecting a fallback set of code to load and execute in place of the first set of code, if the quantity exceeds the threshold;
    means for measuring an amount of reserve power from a power source; and
    means for dynamically adjusting the threshold commensurate the measured amount of reserve power.

13. The system of claim 12, wherein the means for determining comprises code executing on a processing unit of a microcontroller.

14. The system of claim 12, wherein the means for tracking includes a counter.

15. A non-transitory machine-readable medium containing instructions stored thereon that when operated on by the machine cause the machine to perform operations comprising:
    tracking a number of occurrences a first set of code causes a system to perform a reset action;
    determining whether the number of occurrences exceeds a threshold;
    selecting a second set of code to execute in place of the first set of code, if the quantity exceeds the threshold;
    measuring an amount of reserve power from a power source; and
    dynamically adjusting the threshold commensurate the measured amount of reserve power.

16. The medium of claim 15, wherein the selecting a second set of code includes writing the second set of code from a backup memory space to a space occupied by the first set of code.

17. The medium of claim 15, wherein selecting a second set of code includes transitioning the system operation to a previous version of the code.

18. An apparatus comprising:
    a memory to store a first set of code and a second set of code;
    a processor to execute the first set of code;
    a timer to receive alerts from the processor and to send a reset to the processor if an alert is not received before expiration of the timer;
    a counter to receive a count for each reset;
    wherein if the counter exceeds a threshold, the first set of code is exchanged for the second set of code so that the processor executes the second set of code instead of the first set of code and wherein the threshold is dynamically adjusted commensurate with a measured amount of reserve power.

19. The apparatus of claim 18, further comprising a detection module to detect events associated with power transitions, to change the power state of the system upon certain events, and to increment the counter when the system resets.

20. The apparatus of claim 18, further comprising a record to indicate the code that was running at each reset.

* * * * *